United States Patent

Keyser

[15] 3,636,983

[45] Jan. 25, 1972

[54] METHOD AND APPARATUS FOR INCREASING FLUID FLOW

[72] Inventor: Edwin J. Keyser, 14513 Mulholland Drive, Los Angeles, Calif. 90024

[22] Filed: Aug. 14, 1970

[21] Appl. No.: 63,691

[52] U.S. Cl............................................................138/39
[51] Int. Cl.............................................................F15d 1/02
[58] Field of Search...............................................138/37–46; 251/126

[56] References Cited

UNITED STATES PATENTS

| 646,378 | 3/1900 | Szamatolski | 138/39 |
| 2,570,155 | 10/1951 | Redding | 138/39 |
| 3,027,143 | 3/1962 | Furgerson et al. | 138/39 |

*Primary Examiner*—Houston S. Bell, Jr.
*Attorney*—Fulwider, Patton, Rieber, Lee & Utecht

[57] ABSTRACT

A method and fluid flow device for increasing the rate of flow of a fluid by inducing angular velocities in the flow entering the device thereby to reduce the upstream static pressure, and carrying the angular velocities through the device where it is nullified before leaving the device, thereby to increase the downstream static pressure. Reducing the static pressure of the fluid entering the device and increasing the static pressure of the fluid leaving the device results in two forces of acceleration tending to increase the rate of flow through the device. In one embodiment, the device is a venturi-type nozzle having a forward set of baffles in the converging section and a rear set of baffles in the diverging section, and in another embodiment, the device is a teardrop-shaped flow restriction in a conduit and has a forward set of corrugated baffles and a rear set of corrugated baffles.

16 Claims, 8 Drawing Figures

INVENTOR:
EDWIN J. KEYSER
BY Fulwider, Patton, Rieber
Lee, and Utecht
ATTORNEYS

INVENTOR.
EDWIN J. KEYSER
BY Fulwider, Patton, Rieber,
Lee, and Utecht
ATTORNEYS 3,636,983

1

METHOD AND APPARATUS FOR INCREASING FLUID FLOW

BACKGROUND OF THE INVENTION

This invention relates to fluid flow devices and methods of controlling fluid flows, and has particular reference to a method and device for increasing a fluid flow.

It is well known that when a fluid moves through a horizontal, constant diameter conduit in a condition of parallel, laminar, steady state flow, the velocity, dynamic pressure and static pressure flow parameters do not vary from location to location along the conduit. If a converging-diverging restriction, such as a venturi or a central teardrop-shapped body, is placed in the constant diameter conduit and the velocity, dynamic pressure and static pressure parameters of flow are measured at locations sufficiently spaced upstream and downstream on either side of the restriction, the values will remain unchanged, again assuming parallel, laminar, steady-state flow through the conduit.

An analysis of the fluid flow through the restriction shows that the fluid accelerates as it enters the converging section of the restriction and then decelerates after passing through the throat to the diverging section. As the fluid initially enters the restriction, the direction of the fluid velocity is purely longitudinal and is parallel with the center line of the conduit. Upon reaching the converging section, however, the fluid is forced to constrict radially and, in so doing, accelerates both longitudinally and transversely.

In a venturi-type restriction, for example, the flow is constricted radially inwardly in the converging section. As a result, the flow particles develop transverse velocity components thereby creating dynamic pressure components, both of which are directed inwardly towards the center line of the conduit. Similarly, if the restriction is a teardrop-shaped body centrally positioned in the conduit, the flow will be constricted radially outwardly in the converging section, and both the transverse velocity components and dynamic pressure components of the flow particles will be outwardly directed.

Thus, as the flow is constricted by the converging section, transverse velocity and dynamic pressure components appear which are directed radially of the conduit. The transverse velocity and dynamic pressure components appear with the first constriction of the flow and are present throughout the length of the converging section. Upon reaching the throat, however, the fluid flow is again purely longitudinal and the transverse velocity and dynamic pressure components disappear.

In a similar, but reversed manner, after the flow passes through the throat, it expands in the diverging section and decelerates, and again develops transverse velocity and dynamic pressure components which, in the case of the venturi restriction, are now directed outwardly, and in the case of the teardrop-shaped restriction, are now directed inwardly. This deceleration of the fluid continues until the flow returns to parallel laminar flow longitudinally of the conduit.

Since a dynamic pressure rise is necessarily accompanied by a corresponding reduction in static pressure, the appearance of a transverse velocity component is accompanied by a corresponding reduction in static pressure. Thus, the appearance of transverse velocity components in the converging and in the diverging sections necessarily results in the lowering of static pressures.

However, the appearance of the transverse velocity components of the flow particles in the converging and diverging sections has little, if any, effect on the net static pressure in the restriction since the transverse velocities appear and disappear with the transverse dynamic pressures independently within each section of the restriction. That is, the transverse velocity appearing in the converging section also disappears in the converging section so that any static pressure reduction resulting from the transverse velocity appearance is offset by a corresponding rise in static pressure accompanying the disappearance of the transverse velocity as the flow enters the throat. Therefore, there is virtually no change in the rate of flow through the restriction even though changes in static pressure do take place.

SUMMARY OF THE INVENTION

The present invention resides in a method and device for increasing the rate of flow of a fluid stream through a restriction of the foregoing general character by inducing transverse velocity components in the fluid stream in the converging section, thereby converting static pressure into dynamic pressure, reacting the transverse velocity components with the device to change the direction of the components, transferring the dynamic pressure through the fluid stream, and subsequently converting the dynamic pressure back to static pressure in the diverging section. The conversion of static pressure to dynamic pressure in the converging section lowers the static pressure in the converging section and acts to accelerate fluid into the restriction, while the conversion of dynamic pressure back to static pressure in the diverging section increases the static pressure in the diverging section and tends to accelerate the fluid downstream out of the restriction, the combined effect of the two accelerations being to increase the flow rate through the restriction.

The flow particles having transverse velocity components are reacted with the device to change the directions of the components from linear velocities to angular velocities. The transverse angular velocities are produced in the converging section by a first set of baffles which react against the flow particles having transverse linear velocities. The transverse angular velocities then are carried by the longitudinal flow through the converging section to the diverging section where a second set of baffles reacts against the transverse angular velocities to nullify the angular velocities and thus raise the static pressure.

In one embodiment, the device is in the form of a venturi nozzle with the first and second sets of baffles each comprising a plurality of flat plates positioned with their flat surfaces parallel with the center line of the nozzle and offset from the radial so that the flat surfaces are perpendicular to the transverse velocity components and parallel with the longitudinal velocity components in both the converging and diverging sections. In a second embodiment, the device is in the form of a teardrop-shaped flow restriction and employs radial, corrugated baffles as both the first and second sets of baffles.

The second embodiment finds particular application in turbulent flow situations and produces angular velocity components 12 the flow in the form of random turbulence by reacting the first set of baffles against the transverse linear velocity components of the flow. The second set of baffles in the diverging section reacts against the flow to nullify the random turbulence induced in the converging section and thereby raise the static pressure in the diverging section.

The features and advantages of the present invention will be apparent from the following detailed description taken in conjunction with the accompanying drawings.

DETAILED DESCRIPTION

Figure 1:
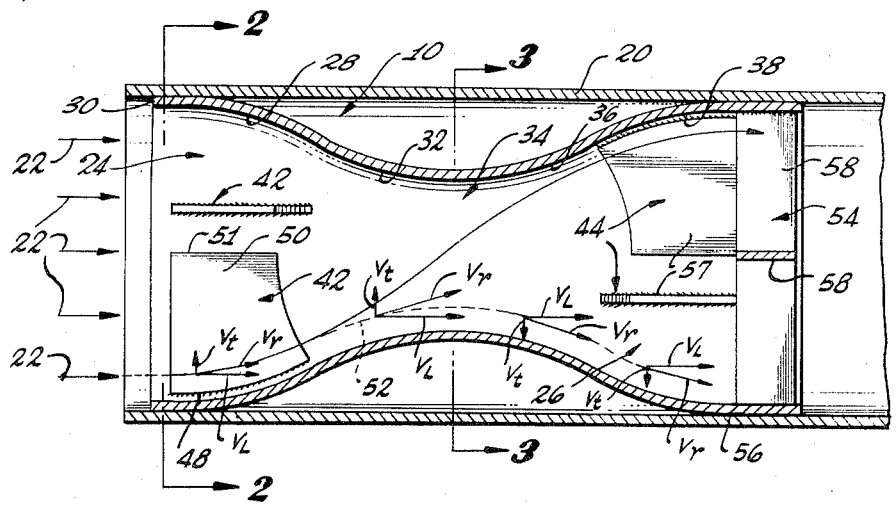
FIG. 1 is a longitudinal sectional view of a fluid conduit within which a nozzle embodying the novel features of the present invention is placed, and illustrating a means for carrying out the method of this invention.

As shown in the drawings, the present invention is embodied in a fluid flow device or body, designated generally by the reference numeral 10, and a method and improvements in the device for reducing the static pressure in an upstream portion of the device and increasing the static pressure in a downstream portion in such a manner as to produce an increase in the rate of flow of a fluid through the device. In this instance, referring to the embodiment of FIGS. 1 through 4, the device 10 is in the form of a venturi-type nozzle having a circular cross section throughout its length and having a front converging section 24 and a rear diverging section 26. The nozzle 10 is coaxially mounted in a portion of a cylindrical conduit 20 in which a fluid moves from left to right, as indicated by the arrows 22.

Preferably, the converging section 24 has a forward concave inside wall portion 28 extending rearwardly (to the right in FIG. 1) from the front end 30 and terminating at a forward convex inside wall portion 32. The forward convex portion 32 extends rearwardly from the forward concave portion 28 and merges with the concave portion with a smooth and continuous curve between the front end 30 and the throat 34 of the nozzle 10. The diverging section 26, in cross section, is a mirror image of the converging section 24 and has a rear convex inside wall portion 36 and a rear concave inside wall portion 38, the diverging section preferably being of substantially the same size and shape as the converging section so that the nozzle 10 is symmetrical on each side of the throat 34.

In accordance with the present invention, the flow of fluid through the nozzle 10 is increased by inducing transverse velocity components in the flow and reacting these components with the nozzle to produce angular velocities in the converging section 24, thereby converting static pressure into dynamic pressure, transmitting the dynamic pressure in the form of angular velocities through the fluid stream, and subsequently converting the dynamic pressure back to static pressure in the diverging section 26, thereby increasing the static pressure in the diverging section. The reduction in static pressure in the converging section 24 tends to accelerate fluid into the nozzle 10 while the increased static pressure in the diverging section 26 tends to accelerate fluid downstream out of the nozzle. The combined effect of these two accelerating forces is a tendency to increase the rate of flow through the nozzle 10.

Toward these ends, a first set of baffles 42 is positioned in the converging section 24 of the nozzle 10 to react against a portion of the flow, imparting angular velocities to the flow and converting static pressure to dynamic pressure. The angular velocities are carried by the flow to the diverging section 26 where a second set of baffles 44 react against the flow to nullify the angular velocities and thus convert the dynamic pressure back to static pressure.

Figure 2:
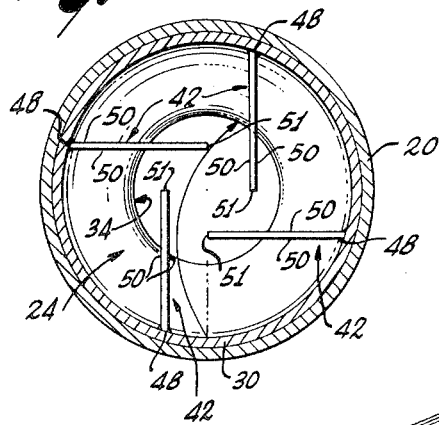
FIG. 2 is a side elevational view, partly in cross section, of the conduit and nozzle of FIG. 1, the cross section being taken substantially along line 2—2 of FIG. 1.

Referring particularly to FIGS. 1 and 2, the first set of baffles 42 herein comprises four thin flat plates having radially outer edges 48 curved to fit the arc of the forward concave portion 28 of the converging section 24. These plates 42 are secured, for example by welding, to the forward concave portion 28 and are regularly spaced so that each projects into the flow passage through the nozzle 10.

Figure 3:
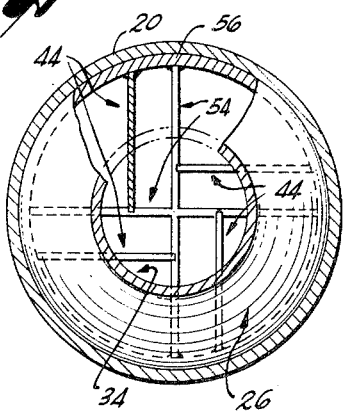
FIG. 3 is a sectional view of the conduit and nozzle of FIG. 1, taken substantially along the line 3—3 of FIG. 1.
Figure 4:
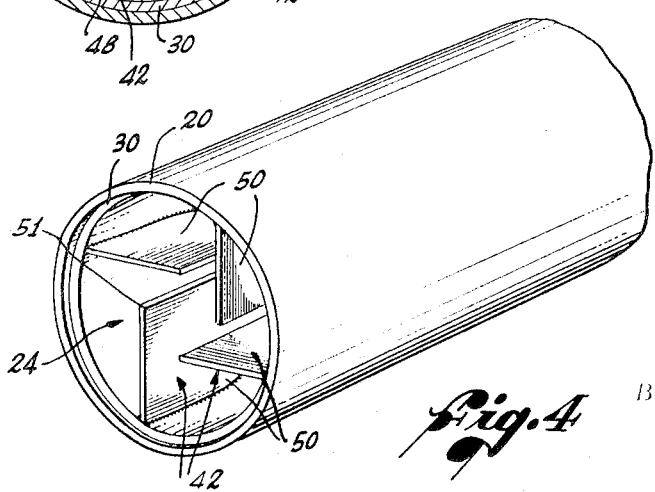
FIG. 4 is a fragmentary perspective view of the conduit and nozzle of FIG. 1.

The four forward plates 42 are arranged with their flat surfaces 50 lying in planes parallel with the longitudinal direction of fluid flow through the nozzle 10, each plate being perpendicular to the adjacent plate on each side and being offset from and parallel to a radius so that the inner edges 51 of all plates are tangent to a common cylinder (not shown) having a longitudinal axis which coincides with the longitudinal axis of the nozzle. The second set of baffles 44 similarly comprises four thin flat plates arranged, as best seen in FIG. 3, in a manner substantially like that of the first set 42, discussed above.

Assuming the fluid flow entering the converging section 24 is initially in a condition of parallel laminar, steady-state flow, the fluid begins to be constricted by the concave portion 28. As shown by the dashed line flow path 52, in the absence of the first set of baffles 42, the forward concave portion 28 forces the flow to accelerate radially inwardly towards the centerline of the nozzle 10, and hence the flow has a resultant velocity ($V_r$) which includes not only the longitudinal velocity component ($V_L$), but also a transverse velocity component ($V_t$) directed inwardly towards the center line of the conduit.

The flow then continues to accelerate radially inwardly until it reaches the forward convex portion 32 where the transverse velocity component ($V_t$) begins to decelerate as the flow moves towards the nozzle throat 34. At the throat 34, the flow again is purely longitudinal with no transverse velocity components.

It is noteworthy that, as the flow accelerates through the forward concave portion 28, the appearance of transverse velocity components in the flow necessarily results in reductions of the static pressure in the regions of the velocity increases, since all increased in dynamic pressure must be accompanied by corresponding static pressure reductions. In the forward convex portion 32, however, the transverse velocity is dissipated, and thus produces a corresponding increase in static pressure in this portion of the converging section 24. Since the static pressure rise in the convex portion 32 is due to the dissipation of the transverse velocities introduced in the concave portion 28, the static pressure rise is substantially equal to the static pressure reduction in the concave portion. Thus, the net static pressure change in the converging section 24 of the nozzle 10 is virtually zero.

A similar action takes place in the diverging section 26 of the nozzle 10 in the absence of the second set of baffles 44. As the flow leaves the throat 34, it expands through the rear convex portion 36 and the static pressure is reduced by the appearance of transverse velocity components in the flow which are directed radially outwardly away from the center line of the nozzle 10. In the rear concave portion 38, however, the static pressure again rises as the transverse velocities are dissipated, thus making the net static pressure change virtually zero over the length of the diverging section 26.

With the present invention, the first set of baffles 42 in the forward concave portion 28 enables the fluid, as it passes through the converging section 24, to transfer static pressure to the diverging section 26. By virtue of the position and configuration of the first set of baffles 42, as the fluid is constricted in the forward concave portion 28, some of the fluid particles having transverse velocity components strike the flat surfaces 50 of the forward plates 42 and are deflected. Thus, the first set of baffles 42 reacts against the flow and imparts uniform turbulence to the flow in the form of angular velocities. The angular velocities imparted to the flow by the first set of baffles 42 cause the flow to twist or rotate in a clockwise direction in FIGS. 2 and 4, as it moves through the converging section 24.

Since the first set of baffles 42 only reacts against the transverse velocity components of the flow and converts these components into angular velocities, the longitudinal velocity components are substantially unaffected by the first set of baffles which have their flat surfaces 50 parallel with the centerline of the conduit. Further, there is no counterpart to the first set of baffles 42 to restrict the flow rotation in the forward convex portion 32, and therefore the flow continues to rotate completely through the converging section 24 and through the throat 34 of the nozzle 10.

As mentioned before, the appearance of transverse velocity components in the forward concave portion 28 necessarily is accompanied by corresponding reductions in static pressure in this portion. The reaction of the forward plates 42 against the flow, in effect, transfers the energy of the transverse velocity components into the energy of transverse angular velocities, and therefore, this energy is carried completely through the converging section 24 without being dissipated in the forward convex portion 32.

Thus, the static pressure reduction accompanying the transverse velocity component appearance in the forward concave portion 28 is not offset or compensated for by a corresponding static pressure rise in the forward convex portion 32 as there is nothing in the forward convex portion to nullify the transverse angular velocities in the flow imparted by the first set of baffles 42. The net effect, then, is a reduction in the overall static pressure in the converging section 24 over any reduction that would have taken place in the absence of the first set of baffles 42, as discussed above.

In fact, the rotation imparted to the flow by the reaction of the first set of baffles 42 increases as the flow moves through the converging section 24 of the nozzle 10 since the radius continually decreases. Thus, since the rate of rotation is inversely proportional to the length of the radius, the rate of rotation of the flow is a maximum at the throat 34.

As the flow leaves the throat 34 and enters the rear convex portion 36, the radius of the nozzle 32 increases and the angular velocities of the flow begin to decelerate. In the rear concave portion 38, the second set of baffles 44 reacts against the angular flow and imparts transverse angular impulses opposite in direction to that of the flow. Thus, the second set of baffles 44 acts against the flow to dispel or nullify the transverse angular velocities of the flow imparted by the first set of baffles and carried over to the diverging section 26 from the converging section 24.

As a result of nullifying the transverse fluid velocities carried over from the converging section 24 in the form of angular velocities, there is a corresponding rise in the static pressure in the rear concave portion 38 of the nozzle 10 which is over and above any static pressure rise which would have resulted in the absence of the first and the second sets of baffles 42 and 44. Thus, the first set of baffles 42 functions to redirect the transverse velocity components of flow in such a manner that these components of velocity are, in effect, transmitted through the fluid stream to the downstream diverging section 26 before being nullified by the second set of baffles 44. This, then, produces a net reduction in the static pressure in the converging section 24 and a net increase in the static pressure in the diverging section 26, each of which is substantially in excess of that which would have been observed, in the absence of the first and second sets of baffles 42 and 44.

To ensure that all flow rotation has been nullified before flow leaves the nozzle 10, an additional set of cross baffles 54 is provided at the rear end 56 of the nozzle. In this instance, the cross baffles 54 are two generally rectangular plates having flat sides 57 which extend diametrically across the rear end 56 of the nozzle 10 and divide the flow passage into four equal pie-shaped segments. The flat sides 57 of the crossed baffles 54 are parallel with the longitudinal direction of flow and the plates preferably are made relatively thin so that no substantial obstruction to the longitudinal flow is presented. Should any appreciable angular momenta escape being nullified by the second set of baffles 44, the crossed baffles 54 will react against the flow and dissipate the residual flow rotation.

By lowering the static pressure in the converging section 24, an increase in the velocity of the flow through the nozzle 10 results. The reduced static pressure created by the transverse angular velocities imparted to the flow by the first set of baffles 42, acts as a force to accelerate fluid into the nozzle 10 to balance the static pressure reduction. As the velocity of flow into the nozzle 10 increases, the magnitude of the transverse velocity components in the converging section 24 correspondingly increases, thus increasing the transverse angular velocities and further reducing static pressure.

Theoretically, in the absence of any retarding forces such as friction, fluid viscosity and the like, the flow into the nozzle 10 would continue to accelerate until no static pressure existed in the converging section 24. This, of course, does not happen in an actual situation and the flow accelerates only until the inherent flow retarding forces which produce static pressures are in balance with the forces of acceleration of the flow through the nozzle 22.

Similarly, the increased static pressure in the diverging section 26, resulting from nullification of the angular velocities carried over from the converging section 24, acts as a force of acceleration tending to force the fluid out of the nozzle 10. Theoretically, the rise in static pressure in the diverging section 26 should equal the static pressure reduction in the converging section 24. Again, however, due to the inherent retarding forces acting on the fluid in the nozzle 10, the actual static pressure rise is somewhat less than the corresponding static pressure reduction in the converging section 24.

The fluid flow device 10' of the embodiment of FIGS. 5 through 8 takes the form of a teardrop-shaped central restriction or body in the flow passage of the cylindrical conduit 20', and provides a means for transferring static pressure in a manner generally similar to that of the embodiment of FIGS. 1 through 4, parts of this embodiment which correspond to those of the embodiment of FIGS. 1 through 4 being designated by corresponding primed reference numerals. In this instance, the central restriction 10' has a hemispherical forward wall 58 and a conical rear wall 60, the forward portion of the conical rear wall being curved to merge with the rear portion of the hemispherical forward wall to provide a smooth and continuous arcuate interconnection between the forward and rear walls.

The converging section 24' in this embodiment is defined by the flow passage between the forward wall 58 and the cylindrical conduit 20', and the diverging section 26' is defined by the flow passage between the rear wall 60 and the conduit, with the throat 34' defined as the point of maximum flow passage restriction, herein being the line of interconnection between the forward wall and rear wall sections. The first set of baffles 42' in the embodiment of FIGS. 5 through 8 comprises a series of forward plates which herein are corrugated and which project outwardly from the forward wall 58 and lie along radial planes including the centerline of the conduit 20'.

The corrugations of the forward plates 42' preferably are arranged to present a series of flat surfaces 62 which extend longitudinally parallel with the longitudinal direction of flow and perpendicular to the radial direction of the conduit 20'. The second set of baffles 44' is arranged in a manner generally similar to that of the first set of baffles 42', and comprises a series of rear plates which are preferably corrugated, and which are aligned axially with the forward plates 42' and extend radially from the rear wall 60.

Figure 5:
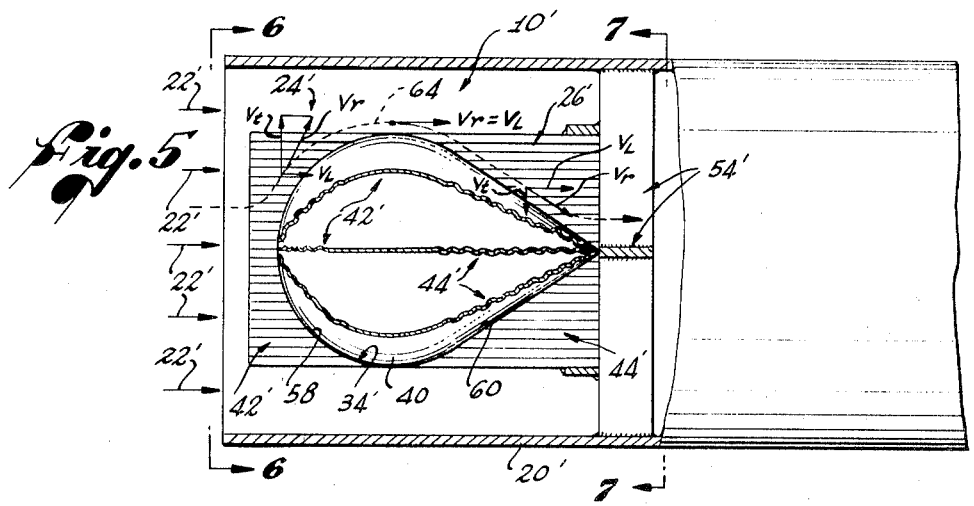
FIG. 5 is a view similar to FIG. 1 showing the alternative embodiment with a teardrop-shaped restriction in the flow conduit.
Figure 6:
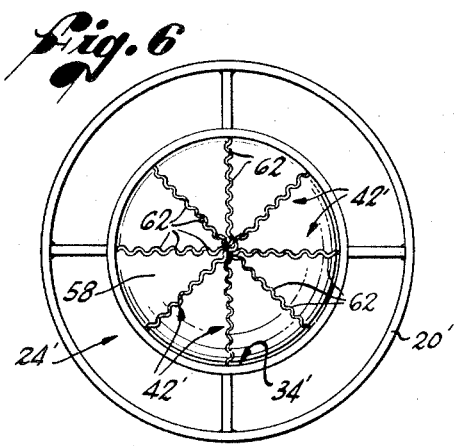
FIG. 6 is a cross-sectional view taken substantially along line 6—6 of FIG. 5.
Figure 7:
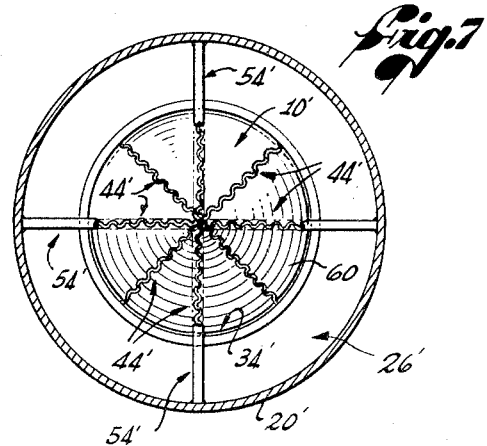
FIG. 7 is a cross-sectional view taken substantially along line 7—7 of FIG. 5.
Figure 8:
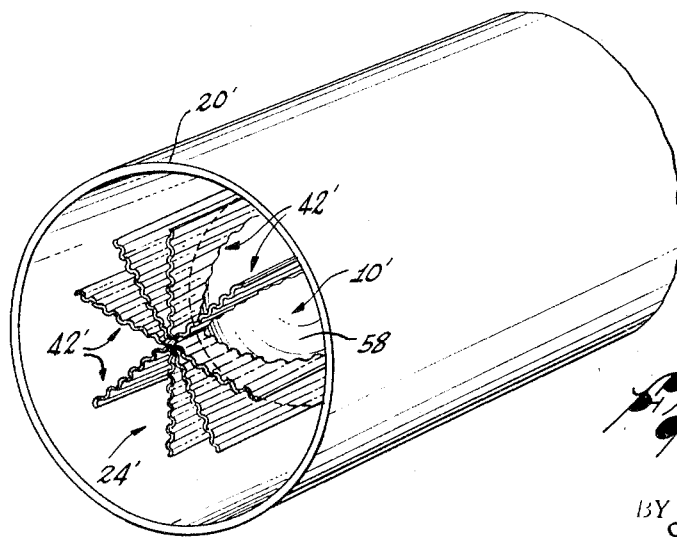
FIG. 8 is a fragmentary perspective view of the conduit and restriction of FIG. 5.

As shown by the dashed flow path 64 illustrated in FIG. 5, fluid flowing in the conduit 20' in a condition of parallel, laminar steady state flow, is constricted by the forward wall 58 of the central restriction 10' so as to converge towards the wall of the conduit. As a result of being constricted, the fluid particles pick up velocity components which are transverse to the longitudinal direction of flow, the direction of the transverse components being radially outwardly towards the wall of the conduit 20'.

In the absence of the first and second sets of baffles 42' and 44', respectively, the net effect produced by the appearance of transverse velocity components in the converging section 24' of the embodiment of FIGS. 5 through 8 would be substantially like that discussed in conjunction with the embodiment of FIGS. 1 through 4 in the absence of the first and second sets of baffles 42 and 44. The net change in static pressure over the length of the converging section 24' would be substantially zero since the transverse components initially accelerate and then decelerate to zero as they move over the forward wall 58 and reach the throat 34'. Similarly, in the absence of the second set of baffles 44' in the diverging section 26', there would be no appreciable rise in static pressure following the dissipation of transverse velocities appearing in the diverging section as the flow is returned to parallel, laminar steady state flow after the flow leaves the central restriction area.

However, the first and second sets of baffles 42' and 44', respectively, provide means for lowering the static pressure in the converging section 24' and transferring the static pressure to the diverging section 26'. The embodiment of FIGS. 5 through 8 finds primary application in situations where random turbulent flow can be expected, and employs a random turbulent flow mechanism for effecting the static pressure transfer.

It is generally recognized that as a fluid flows over a surface, the fluid is subjected to a stationary resisting force at the surface, this force being due primarily to friction and acting in a direction opposite to the direction of fluid flow. The friction force is proportional to the fluid flow velocity and increases in magnitude as the flow velocity increases. Due to fluid viscosity, the friction force at the surface acts not only on the fluid particles immediately adjacent the surface, but also produces an angular stress on fluid particles travelling with the flow and spaced some distance from the surface. As long as the flow is laminar, there is an equal and opposing angular strain in the fluid structure to resist the angular stress resulting from the friction force at the surface.

For every fluid flow, there is an approximate point beyond which the fluid structure cannot resist the angular stress placed upon it by the friction force at the surface. As a result, when the velocity of the fluid flow reaches a point where the fluid structure can no longer resist the angular stress, the flow collapses suddenly and laminar flow becomes random turbulent flow and the individual fluid particles acquire substantial angular momenta and no longer follow predictable paths, but rather travel in unpredictable small circular currents and vortices.

With the appearance of random turbulent flow, a substantial decrease in static pressure in the region of this turbulence takes place. This is attributable to a conversion of static pressure to dynamic pressure as the flow collapses and numerous small vortices appear, some of the vortices rotating in a direction opposite to that of the net rotational flow direction. This pressure conversion is produced by the stationary angular stress at the surface which redirects the average molecular motions within the fluid particles without changing the total energy content of the fluid. Although the average linear velocity of the fluid particles within the flow is reduced slightly from its original value as the random turbulence condition is produced, the total velocity increases substantially due to the additional angular motions of the fluid particles. Similarly, due to the substantial total velocity increase, the static pressure in the random turbulence region is reduced to only a fraction of its original value.

The first set of baffles 42' in the embodiment of the fluid flow device 10' of FIGS. 5 through 8, reacts against a portion of the flow to produce transverse angular velocities in the flow in the form of random turbulence in the converging section 24'. The conversion of static pressure to dynamic pressure reduces the static pressure in the converging section 24', this dynamic pressure then being transmitted to the diverging section 26'. This is accomplished by redirecting a portion of the fluid particles which have transverse velocities into a condition of random turbulence in such a manner that the longitudinal velocity components are substantially unaffected.

As the fluid is initially restricted by the forward wall 58 of the restriction 10', the fluid particles pickup transverse components of velocity, as previously discussed. A portion of the fluid particles having transverse velocity components encounter the flat surfaces 62 of the corrugated first set of baffles 42' and angular stresses are produced on the fluid which are directed radially inwardly and are proportional in magnitude to the transverse velocity magnitudes. By accelerating the fluid in such a manner that the transverse velocity components have a magnitude within the range whereby the fluid can no longer resist the stationary angular stresses, the flow is caused to collapse and convert from laminar to random turbulent flow.

As mentioned before, this conversion results in a substantial reduction in the static pressure in the converging section 24', there being a corresponding increase in the dynamic pressure represented by transverse angular velocities of the fluid, approximately equal to the static pressure reduction. Since the fluid turbulence induced by the corrugated first set of baffles 42' results only from a reaction with the transverse velocity components of the flow, the numerous small vortices formed rotate generally around axes which are parallel to the longitudinal flow direction.

It is noteworthy that the baffles 42' of the first set form an outwardly diverging transverse flow passage in the otherwise converging section 24' between the front of the forward wall 58 and the throat 34'. It is well known that diverging fluid passage tends to induce random turbulence while a converging fluid passage tends to reduce such turbulence. Thus, the random turbulence induced by the transverse reaction of the first set of baffles 42' tends to increase as the fluid approaches the throat 34' since the area between the baffles increases.

The induced random turbulence does not substantially effect the longitudinal flow velocity and is not nullified in the converging section 24'. Thus, the dynamic pressure represented by the vortices of the transformed, and redirected transverse velocity components is carried completely through the converging section 24' with a resultant lowering of the static pressure in the converging section beyond any static pressure reduction which would have taken place in the absence of the first set of baffles 42', as previously discussed.

As the fluid enters the diverging section 26', the second set of baffles 44' reacts against the fluid turbulence as the flow decelerates to nullify the random turbulence and return the flow to a condition of parallel laminar flow. As in the case with the first set of baffles 42', the second set of baffles 44' reacts only against the turbulent fluid particles moving in a direction transverse to the longitudinal direction and thus does not substantially effect the longitudinal flow velocity.

As the random turbulence fluid enters the diverging section 26', the flow vortices encounter the flat surfaces 62 of the corrugated second set of baffles 44' and stationary angular stresses are set up which are directed radially outwardly, and hence in opposition to the direction of rotation of the flow vortices. It should be noted that the second set of baffles 44' form an inwardly converging flow passage from the throat 34' to the rear end of the rear wall 60, this transverse convergence having the effect of reducing random turbulence. Therefore, due to the flow deceleration, the stationary angular stresses and the converging baffles 44', the random turbulence carried over from the converging section 24' is nullified in the diverging section 26'.

The nullifying of this carried-over fluid turbulence results in a corresponding lowering of the dynamic pressure and increasing of the static pressure in the diverging section 26'. Thus, the static pressure reduction in the converging section 24' represented by the induced random turbulent flow, is carried over to the diverging section 26' where the fluid turbulence is nullified producing a corresponding increase in static pressure.

As in the case with the embodiment of FIGS. 1 through 4, the result obtained by lowering the static pressure in the converging section 24' and increasing the static pressure in the diverging section 26', is to increase the rate of flow through the conduit 20'. Thus, although the embodiment of FIGS. 5 through 8 employs a random turbulent flow mechanism for effecting the transfer of static pressure, the result obtained is generally similar to the result obtained with the embodiment of FIGS. 1 through 4 which employs a uniform turbulence flow mechanism.

From the above, it should be evident that the method of the present invention enables the rate of flow of a fluid stream through a fluid flow device to be increased over that heretofore possible. Further, the fluid flow device 10 of the present invention provides a means whereby the static pressure on the leading surface can be reduced and transferred to the trailing surface in accordance with the novel method of the invention.

It will be apparent from the foregoing that, while particular forms of the invention have been illustrated and described, various modifications can be made without departing from the spirit and scope of the invention.

I claim:

1. The method of reducing static pressure on a leading surface of a body in a fluid stream comprising the steps of:

inducing transverse velocity components in the fluid stream along the forward surface thereby converting static pressure of the fluid to dynamic pressure and correspondingly thereby reducing the static pressure on the forward surface;

reacting the transverse velocity components with the body along the forward surface to change the direction of the components for transmission of the dynamic pressure through the fluid stream;

and transmitting the dynamic pressure through the fluid stream away from the forward surface.

2. The method as defined in claim 1 in which the transverse velocity components in the fluid stream are reacted with the body to impart turbulent flow to the stream, the dynamic pressure being transmitted away from the forward surface as turbulent flow.

3. The method as defined in claim 2 in which the turbulent flow is imparted by reacting the transverse velocity components with the body to produce angular velocities in the flow.

4. The method of reducing static pressure on a forward surface of a body in a fluid stream while increasing static pressure on a rear surface of the body, said method comprising the steps of:

inducing transverse velocity components in the fluid stream along the forward surface thereby converting static pressure of the fluid to dynamic pressure and correspondingly thereby reducing the static pressure on the forward surface;

reacting the transverse velocity components with the body along the forward surface to change the direction of the components for transmission of the dynamic pressure through the fluid stream;

transmitting the dynamic pressure through the fluid stream to the rear surface;

and reacting the dynamic pressure with the body along the rear surface to reconvert the dynamic pressure to static pressure on the rear surface.

5. The method as defined in claim 4 in which the transverse velocity components in the fluid stream are reacted with the body to impart turbulent flow to the stream, the dynamic pressure being transmitted through the stream to the rear surface as turbulent flow which is reacted with the body to reconvert the dynamic pressure to static pressure.

6. The method as defined in claim 5 in which the turbulent flow is imparted by reacting the transverse velocity components with the body to produce angular velocities in the flow.

7. The method as defined in claim 4 in which the transverse velocity components are reacted with the body to impart uniform turbulent flow to the stream, the dynamic pressure being transmitted to the rear surface as uniform turbulence.

8. The method as defined in claim 7 in which the transverse velocity is induced by constricting the flow stream to pass through the body.

9. The method as defined in claim 4 in which the transverse velocity components are reacted with the body to impart random turbulent flow to the stream, the dynamic pressure being transmitted to the rear surface as random turbulence.

10. The method as defined in claim 9 in which the transverse velocity is induced by constricting the flow stream to pass around the body within a conduit.

11. A fluid flow device for increasing the rate of flow of a fluid stream relative to the device, said device comprising:

a forward surface and a rear surface coupled with said forward surface;

means for inducing transverse velocity components in the fluid stream along said forward surface thereby to convert static pressure of the fluid to dynamic pressure and correspondingly thereby reducing static pressure on said forward surface;

means adjacent said forward surface for reacting with said transverse velocity components to change the direction of said components for transmission of said dynamic pressure to said rear surface;

and means for transmitting said dynamic pressure to said rear surface whereby the conversion of static pressure to dynamic pressure and the transmission of said dynamic pressure to said rear surface reduces the static pressure in said forward surface thereby accelerating said fluid stream relative to said device.

12. A fluid flow device as defined in claim 11 further including:

means adjacent said rear surface for reacting with said dynamic pressure to reconvert said dynamic pressure to static pressure on said rear surface, thereby increasing the static pressure on said rear surface.

13. A fluid flow device as defined in claim 12 wherein:

said means for reacting with said transverse velocity components comprise at least one forward baffle supported by said forward surface;

and said means for reacting with said dynamic pressure comprise at least one rear baffle supported by said rear surface.

14. A fluid flow device as defined in claim 13 wherein:

said forward surface is a flow-converging surface, and said rear surface is a flow-diverging surface;

and said means for inducing said transverse velocity components comprises constricting said flow along said converging surface.

15. A fluid flow device as defined in claim 14 wherein:

said device is a venturi nozzle;

and said forward and rear baffles each comprise a flat plate which projects inwardly of said nozzle and lies along a plane offset from and parallel to a radius of said nozzle.

16. A fluid flow device as defined in claim 14 wherein:

said device is a teardrop-shaped body centrally supported in a tubular flow conduit;

and said forward and rear baffles each comprises a plate which projects outwardly of said body and lies along radial planes including the centerline of said conduit.

* * * * *

PO-1050
(5/69)

UNITED STATES PATENT OFFICE
CERTIFICATE OF CORRECTION

Patent No. 3,636,983          Dated January 25, 1972

Inventor(s) EDWIN J. KEYSER

It is certified that error appears in the above-identified patent and that said Letters Patent are hereby corrected as shown below:

Column 1, line 14, change "shapped" to --shaped--.

Column 2, line 48, change "12" to --in--.

Column 8, line 14, after "that" insert --a--.

Signed and sealed this 22nd day of August 1972.

(SEAL)
Attest:

EDWARD M. FLETCHER, JR.                    ROBERT GOTTSCHALK
Attesting Officer                          Commissioner of Patents